United States Patent
Yuds et al.

(10) Patent No.: US 12,537,097 B2
(45) Date of Patent: Jan. 27, 2026

(54) MULTI-FUNCTION WIRELESS DEVICE PROVIDING DATA TRANSFER FUNCTIONALITY BETWEEN INTERCONNECTED MEDICAL DEVICES

(71) Applicant: Fresenius Medical Care Holdings, Inc., Waltham, MA (US)

(72) Inventors: David Yuds, Hudson, NH (US); Martin Joseph Crnkovich, Walnut Creek, CA (US); Roland Levin, San Ramon, CA (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 911 days.

(21) Appl. No.: 17/829,463

(22) Filed: Jun. 1, 2022

(65) Prior Publication Data
US 2023/0395245 A1 Dec. 7, 2023

(51) Int. Cl.
| | |
|---|---|
| *G16H 40/40* | (2018.01) |
| *A61M 1/14* | (2006.01) |
| *G16H 10/40* | (2018.01) |
| *G16H 40/67* | (2018.01) |
| *H04W 4/80* | (2018.01) |

(52) U.S. Cl.
CPC .............. *G16H 40/40* (2018.01); *A61M 1/14* (2013.01); *G16H 10/40* (2018.01); *G16H 40/67* (2018.01); *H04W 4/80* (2018.02)

(58) Field of Classification Search
None
See application file for complete search history.

(56) References Cited

U.S. PATENT DOCUMENTS

| | | |
|---|---|---|
| 3,352,779 A | 11/1967 | Austin et al. |
| 5,822,544 A | 10/1998 | Chaco et al. |
| 6,673,314 B1 | 1/2004 | Burbank et al. |
| 7,033,539 B2 | 4/2006 | Krensky et al. |

(Continued)

FOREIGN PATENT DOCUMENTS

| | | |
|---|---|---|
| CN | 101189614 | 5/2008 |
| CN | 101505810 | 8/2009 |

(Continued)

OTHER PUBLICATIONS

International Search Report and Written Opinion in International Appln. No. PCT/US2023/022655, mailed Sep. 1, 2023, 13 pages.

(Continued)

*Primary Examiner* — Manuel A Mendez
(74) *Attorney, Agent, or Firm* — Fish & Richardson P.C.

(57) ABSTRACT

Medical devices and peripheral devices can be configured to wirelessly communicate with each other and other devices through a connection between the devices. Peripheral devices may include weight scales, blood pressure monitors and/or other medical components that may be used in connection with measuring patient information related to a medical treatment by a medical device, such as a dialysis treatment performed by a dialysis machine. A medical function/data transfer device according to the system described herein may include multi-function capabilities to provide for a medical monitoring or treatment function as well as a data transfer function for transferring data between interconnected medical devices.

24 Claims, 6 Drawing Sheets

(56) References Cited

U.S. PATENT DOCUMENTS

| | | | |
|---|---|---|---|
| 7,044,927 | B2 | 5/2006 | Mueller et al. |
| 7,699,806 | B2 | 4/2010 | Ware et al. |
| 8,190,651 | B2 | 5/2012 | Treu et al. |
| 8,313,642 | B2 | 11/2012 | Yu et al. |
| 8,315,885 | B2 | 11/2012 | Krogh et al. |
| 8,449,471 | B2 | 5/2013 | Tran |
| 8,549,600 | B2 | 10/2013 | Shedrinsky |
| 8,776,246 | B2 | 7/2014 | Allegri et al. |
| 8,871,095 | B2 | 10/2014 | Yu et al. |
| 8,905,959 | B2 | 12/2014 | Basaglia |
| 8,909,613 | B2 | 12/2014 | Treu et al. |
| 8,996,393 | B2 | 3/2015 | Sobie |
| 9,383,876 | B2 | 7/2016 | Riedijk et al. |
| 9,489,559 | B2 | 11/2016 | Weber et al. |
| 9,672,401 | B2 | 6/2017 | Riedijk et al. |
| 9,800,663 | B2 | 10/2017 | Arrizza |
| 10,108,793 | B2 | 10/2018 | Danikhno et al. |
| 10,305,690 | B1 | 5/2019 | Gehrmann et al. |
| 10,325,133 | B2 | 6/2019 | Ghavanini et al. |
| 10,325,135 | B2 | 6/2019 | Andersen et al. |
| 10,532,139 | B2 | 1/2020 | Medina et al. |
| 10,905,376 | B2 | 2/2021 | Baker |
| 11,020,285 | B1 | 6/2021 | King et al. |
| 11,343,105 | B2 | 5/2022 | Ekdahl et al. |
| 2002/0184415 | A1* | 12/2002 | Naghavi .......... G16H 40/67 710/64 |
| 2003/0002678 | A1 | 1/2003 | Kim |
| 2008/0227393 | A1 | 9/2008 | Tang et al. |
| 2009/0275881 | A1 | 11/2009 | Lo et al. |
| 2011/0093294 | A1 | 4/2011 | Elahi et al. |
| 2011/0213216 | A1* | 9/2011 | McKenna .......... A61B 5/0002 600/301 |
| 2012/0003933 | A1 | 1/2012 | Baker et al. |
| 2012/0194335 | A1 | 8/2012 | Burbank et al. |
| 2012/0212455 | A1 | 8/2012 | Kloeffel |
| 2012/0297255 | A1 | 11/2012 | Case et al. |
| 2013/0138452 | A1 | 5/2013 | Cork et al. |
| 2013/0141329 | A1 | 6/2013 | Halbert et al. |
| 2013/0310726 | A1 | 11/2013 | Miller et al. |
| 2013/0346102 | A1 | 12/2013 | Yu et al. |
| 2014/0006510 | A1 | 1/2014 | Hamilton et al. |
| 2014/0094124 | A1 | 4/2014 | Dave et al. |
| 2014/0148104 | A1 | 5/2014 | Marterstock |
| 2014/0276375 | A1 | 9/2014 | Minkus |
| 2014/0288947 | A1 | 9/2014 | Simpson et al. |
| 2015/0011970 | A1 | 1/2015 | Kamen et al. |
| 2015/0095041 | A1 | 4/2015 | Kim |
| 2015/0372746 | A1 | 12/2015 | Xie et al. |
| 2017/0087290 | A1 | 3/2017 | Medina et al. |
| 2018/0042558 | A1 | 2/2018 | Cabrera, Jr. et al. |
| 2018/0103874 | A1 | 4/2018 | Lee et al. |
| 2018/0316505 | A1 | 11/2018 | Cohen et al. |
| 2019/0015048 | A1 | 1/2019 | Baker |
| 2019/0319685 | A1 | 10/2019 | Chen et al. |
| 2019/0320478 | A1 | 10/2019 | Chen et al. |
| 2020/0114054 | A1 | 4/2020 | Medina et al. |
| 2021/0105200 | A1 | 4/2021 | Chen et al. |
| 2021/0217502 | A1 | 7/2021 | Gassman et al. |

FOREIGN PATENT DOCUMENTS

| | | |
|---|---|---|
| CN | 104054083 | 9/2014 |
| DE | 202015104889 | 10/2015 |
| KR | 101095412 | 12/2011 |
| WO | WO 2011/028261 | 3/2011 |
| WO | WO 2014/004448 | 1/2014 |
| WO | WO 2016/144541 | 9/2016 |
| WO | WO 2016/196556 | 12/2016 |
| WO | WO 2021/260345 | 12/2021 |

OTHER PUBLICATIONS

FDA, Content of Premarket Submissions for Management of Cybersecurity in Medical Devices, Draft Guidance for Industry and Food and Drug Administration Staff, Oct. 2, 2014, 24 pages.

FDA, Postmarket Management of Cybersecurity in Medical Devices: Guidance for Industry and Food and Drug Administration Staff, draft issued Jan. 22, 2016, 30 pages.

fda.gov [online], "FDA Fact Sheet—The FDA's Role in Medical Device Cybersecurity: Dispelling Myths and Understanding Facts," Jun. 29, 2021, retrieved from URL <https://www.fda.gov/files/medical%20devices/published/cybersecurity-fact-sheet.pdf>, 1 page.

Fingerprints, Biometric Technologies, Jan. 2017, 32 pages.

Secure Technology Alliance, Biometric Payments Cards, Mar. 2019, 16 pages.

International Preliminary Report on Patentability in International Appln. No. PCT/US2023/022655, mailed Dec. 12, 2024, 8 pages.

\* cited by examiner

MULTI-FUNCTION WIRELESS DEVICE PROVIDING DATA TRANSFER FUNCTIONALITY BETWEEN INTERCONNECTED MEDICAL DEVICES

TECHNICAL FIELD

This application relates generally to systems and methods for wireless data transfer among medical devices, in particular over one or more wireless connections facilitated by a multi-function wireless device.

BACKGROUND

Medical devices are known for use in the treatment of renal disease. The two principal dialysis methods are hemodialysis (HD) and peritoneal dialysis (PD). During hemodialysis, a patient's blood, that flows from an access site, is passed through a dialyzer of a dialysis machine while also passing dialysate through the dialyzer. A semi-permeable membrane in the dialyzer separates the blood from the dialysate within the dialyzer and allows diffusion and osmosis exchanges to take place between the dialysate and the blood stream. During peritoneal dialysis, the patient's peritoneal cavity is periodically infused with dialysate, or dialysis solution. The membranous lining of the patient's peritoneum acts as a natural semi-permeable membrane that allows diffusion and osmosis exchanges to take place between the solution and the blood stream. Automated peritoneal dialysis machines, also called PD cyclers, are designed to control the entire peritoneal dialysis process so that it can be performed at home, usually overnight, without clinical staff in attendance. Both HD and PD machines may include displays with touch screens or other user interfaces that display information of a dialysis treatment and/or enable an operator or patient to interact with the machine.

Peripheral medical devices, such weight scales and/or blood pressure monitors, may be used to provide patient health and other treatment related information before, during and/or after a medical treatment, such as a dialysis treatment. For example, before each dialysis treatment, a dialysis patient is weighed on a scale to record their current weight. This current weight is then compared against a physician-determined dry weight—the expected weight of a healthy person with the same height and characteristics that is not retaining excess fluid and toxins from failing kidneys. Subtracting the dry weight from the current weight yields the ultrafiltration goal for the day's dialysis session.

Exchanging information between the medical device and peripheral devices, for example taking the patient's measured weight from the scale to input it into the dialysis machine, can be inefficient and prone to error. For instance, a clinician trying to remember the number may mis-remember it and input the wrong weight, leading to the wrong ultrafiltration goal and potential harm to the patient with over- or under-dialysis. In another example, a clinician trying to remember the number may entirely forget it and have to repeat the weight measurement, interrupting clinic workflow and delaying the treatment. In another example, a clinician writing the weight down on a piece of paper may still write the wrong number leading to the above listed problems and must also change gloves in the process, costing more money. Further, using an encrypted patient ID card can be costly and problematic because it requires a card reader at the scale and the dialysis machine, and the card, unique to the patient, can get lost or become damaged. Additionally, in some cases, dialysis clinic scales are equipped with features like Bluetooth to provide for wireless data transfer. However, using Bluetooth to communicate from the scale to the dialysis machine may be impractical in clinics in circumstances where the scale is too far away from the target dialysis machine and/or where there are multiple machines in the vicinity that may potentially cause misidentification problems in the system.

Accordingly, it would be desirable to provide a system and techniques that address the issues noted above.

SUMMARY

According to an implementation of the system described herein, a medical system includes a first medical device that is configured to measure patient data and a second medical device that is configured to perform a medical treatment based on parameters related to the patient data. The medical system further includes a multi-function wireless device that is configured to perform a medical function and that is configured to perform a data transfer function between the first medical device and the second medical device. The multi-function wireless device is configured to establish a first wireless connection with the first medical device and to receive the patient data from the first medical device. The multi-function wireless device is configured to establish a second wireless connection with the second medical device and to transfer the patient data to the second medical device. The multi-function wireless device is configured to perform the medical function related to the medical treatment at the second medical device.

According to another implementation of the system described herein, a method for performing data transfer among medical devices includes: measuring patient data at a first medical device; communicatively pairing a multi-function wireless device with the first medical device to establish a first wireless connection; receiving the patient data at the multi-function wireless device from the first medical device over the first wireless connection; communicatively pairing the multi-function wireless device with a second medical device to establish a second wireless connection; transferring the patient data from the multi-function wireless device to the second medical device over the second wireless connection; and determining parameters of a medical treatment that is performed by the second medical device, wherein the parameters are related to the patient data, wherein the multi-function wireless device performs a medical function related to the medical treatment at the second medical device.

According to multiple implementations of the medical system and method, the first wireless connection and the second wireless connection may be short-range wireless connections, including Near Field Communication (NFC) connections. The medical function of the multi-function wireless device may include wetness detection. The first medical device may be a weight scale, and the patient data may include a weight of a patient. The second medical device may be a dialysis machine, and the medical treatment may be a dialysis treatment. The parameters related to the patient data may include an ultrafiltration goal for the dialysis treatment. The multi-function wireless device may include an interface for a user to initiate a connection and a display for indicating the connection. The system may further include a gateway device that is communicatively coupled to the second medical device and is configured to receive data from the second medical device over a short-range wireless connection. The gateway device may be further configured to transmit the data from the second medical device over a network connection to a remote server.

According to another implementation of the system described herein, a multi-function wireless device for use in a medical system is provided. The multi-function wireless device includes a medical function module that is configured to perform a medical function. The multi-function wireless device includes a data transfer module that is configured to perform a data transfer function between a first medical device and a second medical device. The multi-function wireless device is configured to establish a first wireless connection with the first medical device and to receive patient data from the first medical device, and wherein the multi-function wireless device is configured to establish a second wireless connection with the second medical device and to transfer the patient data to the second medical device. The medical function module is configured to perform the medical function related to the medical treatment at the second medical device. In an implementation, the first wireless connection and the second wireless connection may be short-range wireless connections, and including Near Field Communication (NFC) connections. In another implementation, the medical function of the multi-function wireless device may include wetness detection and the medical function module may include a sensor to detect wetness. The second medical device may be a dialysis machine, and the medical function module may output a signal to the dialysis machine over a communication connection that is separate from the first wireless connection and the second wireless connection.

BRIEF DESCRIPTION OF THE DRAWINGS

Embodiments and features of the system described herein are explained with reference to the several figures of the drawings, which are briefly described as follows.

DETAILED DESCRIPTION

Medical treatment devices (e.g., dialysis machines) and peripheral medical devices can be configured to wirelessly communicate with each other and other devices through a connection between the devices. Peripheral medical devices may include weight scales, blood pressure monitors and/or other medical components that may be used in connection with measuring patient information for a medical treatment, such as a dialysis treatment. A connection established between devices, as described herein, refers to electronic communication between two or more devices such that data can be communicated between the devices. The connection may be established on a network that may include both small scale networks (e.g. for short-range communication) and/or larger scale networks (e.g. using mobile telecommunications). The connection can be a unidirectional connection (in which data travels one way) or a bidirectional connection (in which data travels both ways). Multiple different protocols may be used for establishing the connection between devices.

According to the system described herein, a medical function/data transfer device may include multi-function capabilities to provide for a medical monitoring or treatment function as well as a data transfer function for transferring data among interconnected medical devices.

A dialysis system may include a dialysis machine (e.g., a hemodialysis machine or a peritoneal dialysis machine) that is configured to communicate with a peripheral device having onboard computer processing capabilities, using a wireless connection established according to a wireless communication protocol. Implementations of the wireless connection may include a short-range wireless protocol, such as, for example, Near Field Communication (NFC), WiFi, RFID and/or Bluetooth protocol, among other possible short-range wireless protocols. Although the present disclosure is discussed herein principally in connection with a particular type of dialysis machine, namely a hemodialysis machine, the system described herein may be used and implemented in connection with other configurations of dialysis machines, including different types of hemodialysis machines and peritoneal dialysis machines, as well as other types of medical devices.

Figure 1:
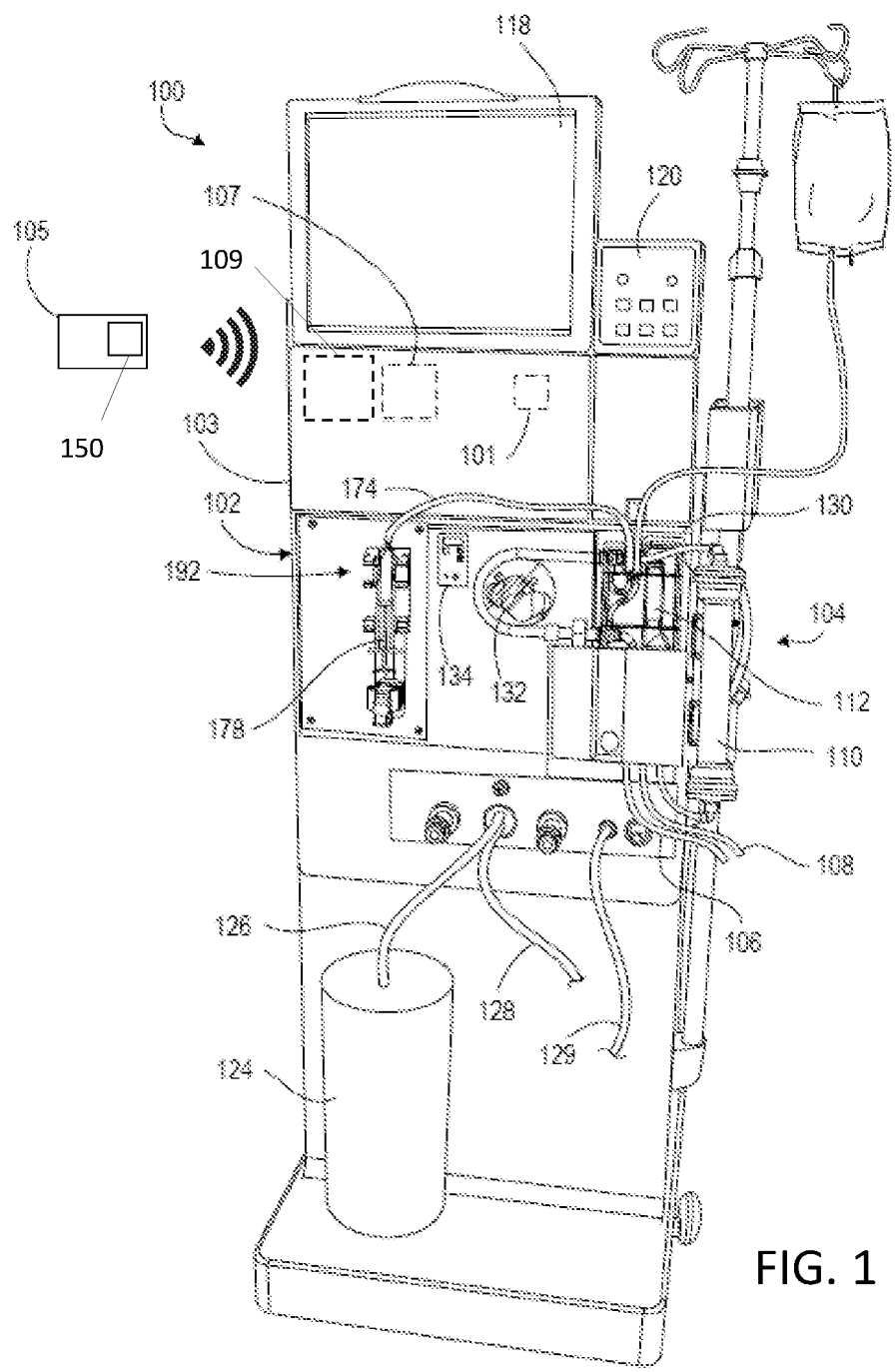
FIG. 1 shows an example of a dialysis machine in a dialysis system with a multi-function wireless device in accordance with the system described herein.

FIG. 1 shows a dialysis system 100 configured to wirelessly communicate with a short-range wireless device, for example, a multi-function wireless device 105 that may include components and capabilities for performing a medical function and a data transfer function involving first and second medical devices, according to multiple implementations of the system described herein. The dialysis system 100 may include a dialysis machine 102, e.g. a hemodialysis machine. In the hemodialysis machine implementation, as illustrated, the dialysis machine 102 is connected to a disposable blood component set 104 that partially forms a blood circuit. It is noted that the system described herein may be implemented in connection with other types of dialysis machines or medical devices, including peritoneal dialysis machines. During a hemodialysis treatment, an operator connects arterial and venous patient lines 106, 108 of the blood component set 104 to a patient. The blood component set 104 includes an air release device 112, which contains a self-sealing vent assembly that allows air but does not allow liquid to pass. As a result, if blood passing through the blood circuit during treatment contains air, the air release device 112 will vent the air to atmosphere.

The blood component set 104 is secured to a module 130 attached to the front of the dialysis machine 102. The module 130 includes the blood pump 132 capable of circulating blood through the blood circuit. The module 130 also includes various other instruments capable of monitoring the blood flowing through the blood circuit. The module 130 includes a door that when closed, as shown in FIG. 1, cooperates with the front face of the module 130 to form a compartment that is sized and shaped to receive the blood component set 104. In the closed position, the door presses certain blood components of the blood component set 104 against corresponding instruments exposed on the front face of the module 130.

The operator uses a blood pump module 134 to operate the blood pump 132. The blood pump module 134 includes a display window, a start/stop key, an up key, a down key, a level adjust key, and an arterial pressure port. The display window displays the blood flow rate setting during blood pump operation. The start/stop key starts and stops the blood pump 132. The up and down keys increase and decrease the speed of the blood pump 132. The level adjust key raises a level of fluid in an arterial drip chamber.

The dialysis machine 102 further includes a dialysate circuit formed by the dialyzer 110, various other dialysate components, and dialysate lines connected to the dialysis machine 102. Many of these dialysate components and dialysate lines are inside the housing 103 of the dialysis machine 102 and are thus not visible in FIG. 1. During treatment, while the blood pump 132 circulates blood through the blood circuit, dialysate pumps (not shown) circulate dialysate through the dialysate circuit.

A dialysate container 124 is connected to the dialysis machine 102 via a dialysate supply line 126. A drain line 128 and an ultrafiltration line 129 also extend from the dialysis machine 102. The dialysate supply line 126, the drain line 128, and the ultrafiltration line 129 are fluidly connected to the various dialysate components and dialysate lines inside the housing 103 of the dialysis machine 102 that form part of the dialysate circuit. During hemodialysis, the dialysate supply line 126 carries fresh dialysate from the dialysate container 124 to the portion of the dialysate circuit located inside the dialysis machine 102. As noted above, the fresh dialysate is circulated through various dialysate lines and dialysate components, including the dialyzer 110, that form the dialysate circuit. As will be described below, as the dialysate passes through the dialyzer 110, it collects toxins from the patient's blood. The resulting spent dialysate is carried from the dialysate circuit to a drain via the drain line 128. When ultrafiltration is performed during treatment, a combination of spent dialysate (described below) and excess fluid drawn from the patient is carried to the drain via the ultrafiltration line 129.

The dialyzer 110 serves as a filter for the patient's blood. The dialysate passes through the dialyzer 110 along with the blood, as described above. A semi-permeable structure (e.g., a semi-permeable membrane and/or semi-permeable microtubes) within the dialyzer 110 separates blood and dialysate passing through the dialyzer 110. This arrangement allows the dialysate to collect toxins from the patient's blood. The filtered blood exiting the dialyzer 110 is returned to the patient. The dialysate exiting the dialyzer 110 includes toxins removed from the blood and is commonly referred to as "spent dialysate." The spent dialysate is routed from the dialyzer 110 to a drain.

A drug pump 192 also extends from the front of the dialysis machine 102. The drug pump 192 is a syringe pump that includes a clamping mechanism configured to retain a syringe 178 of the blood component set 104. The drug pump 192 also includes a stepper motor configured to move the plunger of the syringe 178 along the axis of the syringe 178. A shaft of the stepper motor is secured to the plunger in a manner such that when the stepper motor is operated in a first direction, the shaft forces the plunger into the syringe, and when operated in a second direction, the shaft pulls the plunger out of the syringe 178. The drug pump 192 can thus be used to inject a liquid drug (e.g., heparin) from the syringe 178 into the blood circuit via a drug delivery line 174 during use, or to draw liquid from the blood circuit into the syringe 178 via the drug delivery line 174 during use.

The dialysis machine 102 includes a user interface with input devices such as a touch screen 118 and a control panel 120. The touch screen 118 and the control panel 120 allow the operator to input various different treatment parameters to the dialysis machine 102 and to otherwise control the dialysis machine 102. The touch screen 118 displays information to the operator of the dialysis system 100. The touch screen 118 can also indicate whether the multi-function wireless device 105 is in within communication range of the dialysis machine 102.

The dialysis machine 102 also includes a control unit 101 (e.g., a processor) configured to receive signals from and transmit signals to the touch screen 118, the control panel 120, and a communication module 107 (e.g., a short-range wireless communication transceiver). The control unit 101 can control the operating parameters of the dialysis machine 102, for example, based at least in part on the signals received by the touch screen 118, the control panel 120, and the communication module 107. The communication module 107 is configured to communicate with a short-range wireless device using a short-range wireless protocol. For example, the communication module 107 allows the dialysis machine 102 to communicate with the multi-function wireless device 105. The multi-function wireless device 105 may also include a communication module 150 that operates in connection with the communication module 107.

The control unit 101 is configured to identify presence of the multi-function wireless device 105. For example, when the multi-function wireless device 105 is within wireless communication range of the communication module 107, the communication module 107 can send a signal to the control unit 101 indicating that the multi-function wireless device 105 is present. In response, the control unit 101 can cause the dialysis machine 102 to perform an action, as described in more detail below. Similarly, when the multi-function wireless device 105 (and communication module 150) is taken out of wireless communication range of the communication module 107 (e.g., the multi-function wireless device 105 goes from being in wireless communication range of the communication module 107 to not being in wireless communication range of the communication module 107), the communication module 107 can send a signal to the control unit 101 indicating that the multi-function wireless device 105 is not present. In response, the control unit 101 can cause the dialysis machine 102 to perform an action.

In some implementations, the dialysis system 100 may communicate via another network device, such as a gateway device, that is located in proximity to the dialysis machine (e.g. in the home) and connected via the short-range communication network to the dialysis machine 102 and that also controls access to an unsecure network, such as the Internet. Data may be exchanged between the dialysis machine and a remote network or cloud-based service via the gateway device as part of a connected health system.

Additionally and/or alternatively, the dialysis machine 102 may include a network communication module 109. The network communication module 109 allows the dialysis system 100 to communicate with remote servers, computer systems, databases and/or other medical devices over a network such as a local area network (LAN) or the Internet. The network communication module 109 allows the dialysis system 100 to communicate with other medical devices, computer systems, servers, and/or databases associated with one or more medical facilities. The network communication module 109 may enable communication over the network using wired and/or wireless connections. For example, the network communication module 109 may enable communication using WiFi communication protocols and infrastructure and/or may enable communication using wireless mobile telecommunication networks. The system described herein may use appropriate encryption and security standards and protocols in connection with the transmission of sensitive and/or protected data in accordance with all statutory and regulatory requirements. Other implementations for network connection of the dialysis machine, including use of a gateway device, are further described elsewhere herein.

The communication modules 107, 150 may include short-range communication antennas and modules. The wireless protocols used in connection with the system described herein may include NFC, RFID, Bluetooth (including Bluetooth Low Energy (BLE)), among other possible short-range communication protocols. In various implementations, the wireless protocol used may depend on a particular distance need for pairing and transmitting data according to the system described herein. For example, the communication modules 107, 150 may implement NFC communication as the short-range communication and may be referred to as NFC initiators and NFC targets. NFC is a short-range wireless technology protocol that enables devices to establish radio communication amongst each other (e.g. paired to each other) in order to quickly exchange data over a low latency link (e.g., a link which has relatively low delay between transmission and receipt of a portion of data such as a data packet or frame). Some implementations of NFC techniques are based on standards defined by the International Electrotechnical Commission and/or the International Organization for Standardization (ISO), for example, standards such as ISO 13157 and ISO 18092. As further discussed elsewhere herein, it is noted that short-range communication technologies and protocols other than NFC may be used in connection with the system described herein, including, for example, WiFi and Bluetooth communication protocols. Further, in various implementations, pairing of devices may be performed using one type of protocol, such as NFC, whereas the data transfer may be performed using another type of protocol, such as RFID or Bluetooth, for example.

In some examples, the communication module 107 of the dialysis machine 102 may be an NFC initiator, and the communication module 150 of the multi-function wireless device 105 may be an NFC target. For example, the multi-function wireless device 105 may include a short-range communication technique, such as a contactless chip. Techniques for using contactless chips that could be used with the multi-function wireless device 105 may be defined, see e.g., ISO 14443. The NFC initiator can generate an RF field that powers the NFC target when the NFC target is within operable range of the NFC initiator, thereby allowing the NFC target to provide data to the NFC initiator. In this way, the multi-function wireless device 105 can provide information to the dialysis system 100. In other implementations, the communication module 107 of the dialysis machine 102 may be an NFC target and the multi-function wireless device 105 may be an NFC initiator.

The operable range of the NFC initiator and NFC target may be in the order of inches (e.g., 0-6 inches). In some implementations, the transfer of data is initiated upon the NFC initiator and the NFC target making physical contact with each other. In some implementations, the NFC initiator and/or the NFC target can include a motion sensor (e.g., an accelerometer) to assist in identifying the occurrence of physical contact between the modules. It is noted that in other short-range communication protocol implementations, such as WiFi and/or Bluetooth, the operable range may be larger (e.g. 10 feet or more). The NFC initiator can have an independent power source or it can receive power from a power source that provides power to the electronic device. The NFC initiator can include a loop antenna that uses magnetic induction to generate an RF field.

The NFC target may be a passive module that relies on the power generated by the RF field to operate. The NFC target can include a memory that stores data to be provided to the NFC initiator. The NFC target can also include a loop antenna that is configured to modulate the RF field generated by the NFC initiator. The modulation is based at least in part on the stored data. The NFC initiator can identify characteristics of the modulated field, compare them to characteristics of the generated RF field, and use the comparison information to determine the data stored on the NFC initiator. Because an implementation of the NFC target does not necessarily require its own power supply, in some implementations, the NFC target can take relatively simple form factors that can easily be incorporated into small portable devices, such as the multi-function wireless device 105. However, in other implementations, the NFC target may be powered by its own power supply. In some examples, the NFC target can also generate an RF field, and the NFC initiator can modulate the RF field generated by the NFC target in a manner similar to that described above in order to provide data to the NFC target.

The NFC initiator and NFC target can transfer data at various speeds and according to various codings. For example, data can be transferred at speeds in the range of 100-500 kbit/s according to a delay encoding scheme or a phase encoding scheme. The NFC target and/or the NFC initiator can employ an amplitude modulation scheme (e.g., an amplitude-shift keying scheme) or a phase modulation scheme (e.g., a phase-shift keying scheme), among others, to modulate the generated RF field in order to convey information.

The dialysis system 100 also includes data storage configured to store data corresponding to the short-range wireless devices, including the multi-function wireless device 105, and the processes related thereto. The data storage can be included as part of the dialysis machine 102 or may be remote from the dialysis machine 102 (e.g., on a server accessible by a computer network), as further described elsewhere herein.

The multi-function wireless device 105 is configured to provide information related to the patient to the dialysis system 100 when the multi-function wireless device 105 is in proximity to (e.g., within wireless communication range of) the communication module 107 and/or when manually activated, such as by a button push by an operator and/or other suitable interface activation. In some implementations, the data transfer functionality and processing of the multi-function wireless device 105 may only occur after the multi-function wireless device 105 has been brought into proximity to the communication module 107. In this way, the system described herein may require proximity of the multi-function wireless device 105 to the dialysis machine 102 and initiation by a user, thereby ensuring a requirement of proximity as a safety mechanism for data transfer of the correct information to the dialysis system 100. In response, the dialysis machine 102 can perform an action, such as a medical treatment, using parameters that are based at least in part on the information received from the multi-function wireless device 105. The medical treatment may involve detection of parameters based on measurements obtained from peripheral medical devices, such weight scales and/or blood pressure monitor, that may be used to provide patient health and other treatment related information before, during and/or after the medical treatment, such as a dialysis treatment. For example, before each dialysis treatment, a dialysis patient is weighed on a scale to record their current weight. This current weight is then compared against a physician-determined dry weight—the expected weight of a healthy person with the same height and characteristics that is not retaining excess fluid and toxins from failing kidneys. Subtracting the dry weight from the current weight yields the ultrafiltration goal for the dialysis treatment. In an implementation of the system described herein, the data obtained by and transferred from the multi-function wireless device 105 to the dialysis machine 102 may include, for example, a weight of a patient obtained from a weight scale.

Figure 2:
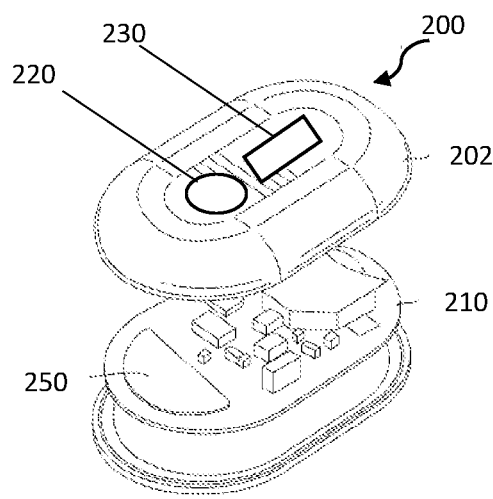
FIG. 2 shows an example of a multi-function wireless device shown in an exemplary implementation as a wetness detector/data transfer device that is configured according to the system described herein.

FIG. 2 shows an example of the multi-function wireless device 105 implemented as a wetness detector/data transfer device 200 that is configured with data transfer functionality according to the system described herein. For patients undergoing hemodialysis, their blood is circulated from their blood access site, through a dialyzer, and back to their body to perform the necessary ultrafiltration. During this time, their access site is continually monitored in the event of a needle dislodgement. Blood loss from a dislodged needle in a hemodialysis treatment can lead to serious injury or death. Needle dislodgement occurs when a needle slips out of a patient's blood access site either due to pulling forces from the blood tubing connected to it or movements of the patient's access limb. A known sensing device, such as the WetAlert wireless wetness detector supplied by Fresenius Medical Care, may be used in conjunction with hemodialysis machines to detect leaks at the patient's blood access site. The WetAlert device battery powered and is taped over the patient's access site bandages. If a needle is dislodged, the resulting blood leak is detected when the fluid bridges the two leads to complete a circuit on the device and this causes the device to send a wireless signal to the hemodialysis machine. The hemodialysis machine software responds by alarming, stopping the blood pump, and/or closing the venous bloodline clamp.

According to an implementation of the system described herein, the wetness detector/data transfer device 200 includes a housing 202 and wetness detection components 210, like components of the WetAlert wetness detector, that function to detect leaks, such as blood leaks and issue warnings, alerts and/or other signals upon detection of a leak, as described above, performed in accordance with medical monitoring/treatment functionality of the device. Further, in accordance with the system described herein, the wetness detector/data transfer device 200 may additionally include other pairing and data collection and transfer functionality for a first medical device that may be used to facilitate, in an automated manner, the data transfer flow processes of patient information that are collected and processed in connection with a medical treatment by a second medical device. For example, as further described herein, the wetness detector/data transfer device 200 may be used to collect patient's weight broadcast from a weight scale (e.g. a first medical device) after the measurement and then used to transmit the weight to the patient's dialysis machine when preparing the patient for a dialysis treatment at the dialysis machine (e.g. a second medical device). As a result of the automated data transfer functionality provided by the wetness detector/data transfer device 200, needed actions by a clinician or caregiver in connection with the medical treatment, e.g. dialysis treatment, may be reduced.

To perform the automated data transfer functions, the wetness detector/data transfer device 200 may include a bi-directional wireless module 250 for short-range wireless communication, including syncing or pairing capability, such as via NFC, RFID and/or Bluetooth protocols (including BLE), for example. A user may initiate pairing and/or data collection actions of the wetness detector/data transfer device 200 with the weight scale and/or with the dialysis machine by activating an interface, such as pressing a button 220. The wetness detector 220 may further include a display 230 that may be a screen to show data collected and/or may include LED lights to show that a data collection and/or transfer has occurred. The bi-directional wireless module 250 may further include one or more processors and/or memory components to process and store data collected according to the system described herein. With the wireless data transfer module 250, the wetness detector/data transfer device 200 may thereby serve a multi-purpose function to provide a medical monitoring function, such as the wetness detection function, while also providing a separate data transfer function. For example, the data transfer function of the wetness detector/data transfer device 200 may be performed in connection with the first medical device (e.g. weight scale) to transfer patient data therefrom to a second medical device (e.g. dialysis machine), while the medical monitoring function may be performed in connection with the second medical device (e.g. wetness detection around a blood access site in connection with a dialysis treatment performed by the second medical device/dialysis machine).

In an implementation, multiple wireless protocols may be used by the wetness detector/data transfer device 200. For example, the pairing protocol of the wetness detector/data transfer device 200 with either of the first or second medical devices may be one protocol, such as NFC, whereas the data transfer protocol may be a different protocol, such as RFID and/or Bluetooth. In another implementation, the wireless communication of the wireless data transfer module 250, e.g., NFC, may be separate from the wireless signals and system of the medical function (e.g. wetness detection) of the wetness detector/data transfer device 200, which may be performed using a different wireless protocol, e.g. WiFi or Bluetooth. Using the multi-purpose wetness detector/data transfer device 200 to electronically transfer other data, such as weight data, provides a number of advantages, including: (i) No costly patient card readers and costly medical device components to receive them because it relies on standard wireless protocols, such as Bluetooth or NFC protocols; (ii) No need to pair a unique item to a unique patient so the clinic does not need to store these in a secure record location; (iii) No interruptions if the device is lost or damaged because a new wetness detector could be immediately paired to the scale and dialysis machine at the time of those interactions; and, (iv) No need to change gloves because the pre-disinfected wetness detector would stay with the patient and her dialysis machine for the duration of the treatment. Although operation of the wetness detector with two medical devices is described above, it is envisioned that the system described herein may be used in connection with more than two medical devices, e.g. to provide data transfer functionality among multiple connected medical devices while also providing a medical monitoring/treatment function among one or more different medical devices.

Figure 3:
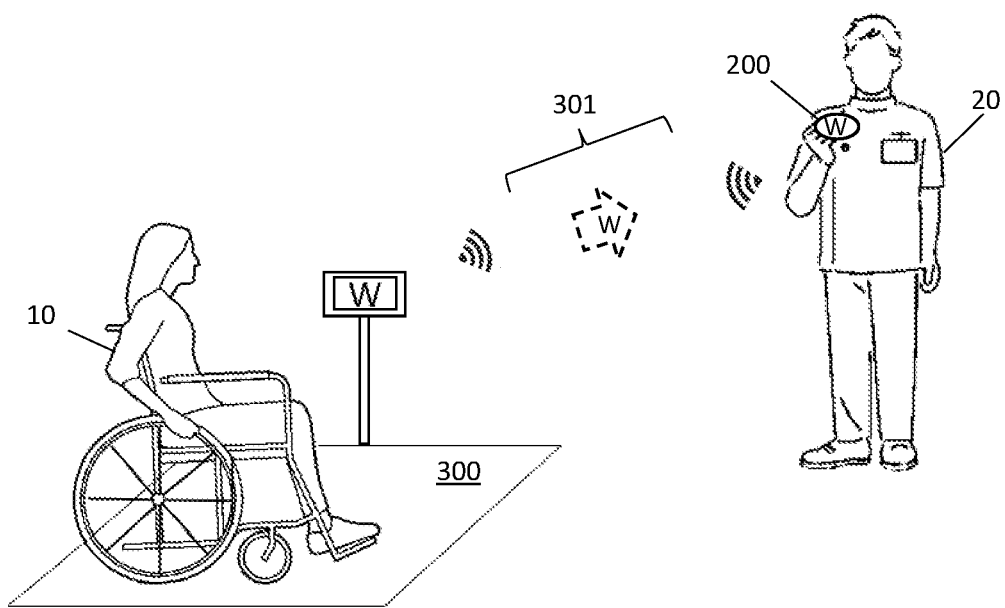
FIG. 3 is a schematic illustration showing the wetness detector/data transfer device collecting weight information from a weight scale according to an implementation of the system described herein.

FIG. 3 is a schematic illustration showing a wetness detector/data transfer device 200 collecting weight information from a weight scale 300 for a patient 10 according to an implementation of the system described herein. It is noted that although the system is described principally by example in connection with the use of a weight scale as a first medical device, it is understood that the system described herein may be used in connection with other types of patient data gathering devices, including blood pressure cuffs and temperature measurers, for example. The wetness detector/data transfer device 200 incorporates a bi-directional wireless interface or Near Field Communications (NFC) module to capture the patient's weight (W) broadcast from the scale 300 after the weight measurement via a wireless connection 301. After the patient 10 is positioned on the weight scale 300, a clinician 20 (or other patient care technician or caregiver) may obtain the wetness detector/data transfer device 200, for example, from a location next to the scale and in which the wetness detector/data transfer device 200 in the location may be configured to receive the scale's measured weight when the clinician 20 activates pairing of the wetness detector/data transfer device 200 with the scale 300, such as by pushing the button 220 and/or by pressing a button on the scale 300. The wetness detector/data transfer device 200 may include a battery, and in some implementations, the wetness detector/data transfer device 200 may be rechargeable, such as using the Qi protocol. It could even be stored in a clinic-cleaned storage basket that wirelessly charges the wetness detector until it is removed from the basket and used to transfer the information, as further described herein.

The wetness detector/data transfer device 200 may then be used to transmit the weight to the patient's dialysis machine when preparing the patient 10 and inputting the prescription into the dialysis machine. The scale 300 will broadcast the weight and the wetness detector/data transfer device 200 receives it in RAM without any other data that could identify the patient 10. The wetness detector/data transfer device 200 would then be taken along with the patient 10 directly to the intended dialysis machine.

Figure 4:
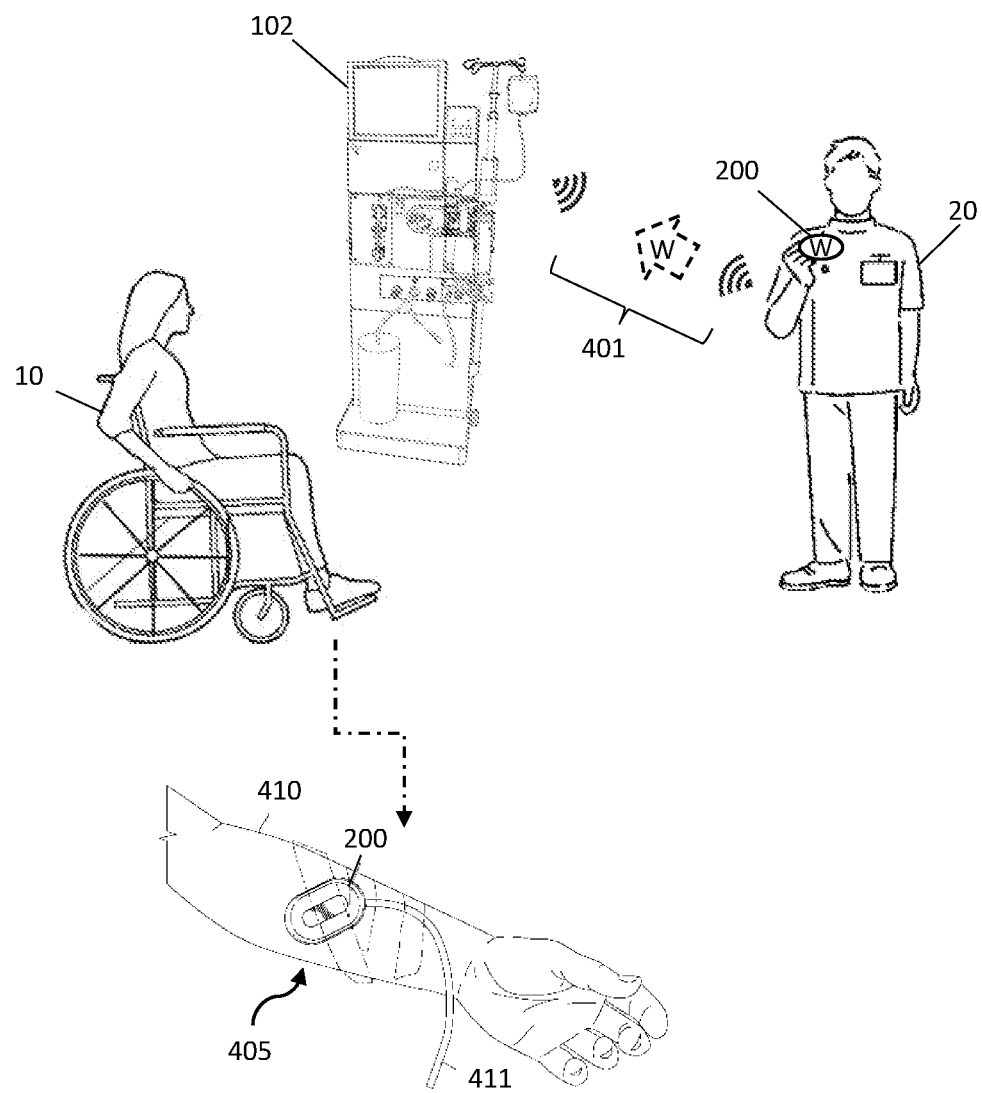
FIG. 4 is a schematic illustration showing the wetness detector/data transfer device being used to transfer collected weight data to a dialysis machine according to an implementation of the system described herein.

FIG. 4 is a schematic illustration of the dialysis system in which the wetness detector is shown being used to transfer collected weight data W from the patient 10 to a dialysis machine 102 according to an implementation of the system described herein. Pressing a button on the dialysis machine 102 and/or the button 220 on the wetness detector/data transfer device 200 synchronizes the two devices and initiates transfer of the weight data W (stored from the scale 200) from the wetness detector/data transfer device 200 to the dialysis machine 102 via a connection 401, which may be, for example, an NFC communication connection. The operator may then confirm the transfer on the dialysis machine 102. Additional features like an LED light on the wetness detector/data transfer device 200 (represented by display 230) may show that the device has captured the weight data W from the scale 200 and then the light would turn off after the dialysis machine 102 received it to show the data has been cleared from the RAM memory of the wetness detector/data transfer device 200: when the light is green, the transfer is clean. After the transfer, the wetness detector/data transfer device 200 is positioned adjacent to the patient's blood access site 405, e.g. adjacent to the to-patient connector at the end of a venous return line 411 on a patient's limb 410 (e.g., arm) so as to perform the wetness detection functionality. As illustrated, in one embodiment, the patient's blood access site 405 may be provided on the patient's arm 410, although this is not necessary. If detection of a leak is determined, the detector is arranged and configured to transmit a signal to the dialysis machine 102, which in response thereto, is arranged and configured to transmit an alarm, stop the blood pump, and/or close the venous bloodline clamp (e.g., valve). In another implementation, it is possible for the wetness detector/data transfer device 200 to be first attached to the patient as described above, and then the weight data transfer functionality to be performed. After the treatment, the wetness detector/data transfer device 200 may be disinfected and placed back in the charging basket, ready to carry the next patient's weight.

In another implementation, the wetness detector/data transfer device 200 may operate completely automatically in connection with the data transfer functionality. The wetness detector/data transfer device 200 may be configured to automatically receive weight data broadcast from the scale when in proximity to the weight scale 300, and the clinician 20 pick up any of multiple wetness detector/data transfer devices that show the data has been received (as indicated with an LED). The clinician 20 may then take the wetness detector/data transfer device 200 from its location near the weight scale along with the patient 10 to the dialysis machine 102. The clinician 20 may later wipe the wetness detector/data transfer device 200 with a disinfectant pad when activating the wetness sensing feature at the patient's dialysis machine, and the wetness detector may automatically transfer the scale weight at that point when brought into proximity (e.g. NFC distance) of the dialysis machine—no button presses would be required on this implementation of the device. In this implementation, confirmation of receipt at the dialysis machine 102 of the correct patient data may be required from the clinician 20 at the dialysis machine 102.

Figure 5:
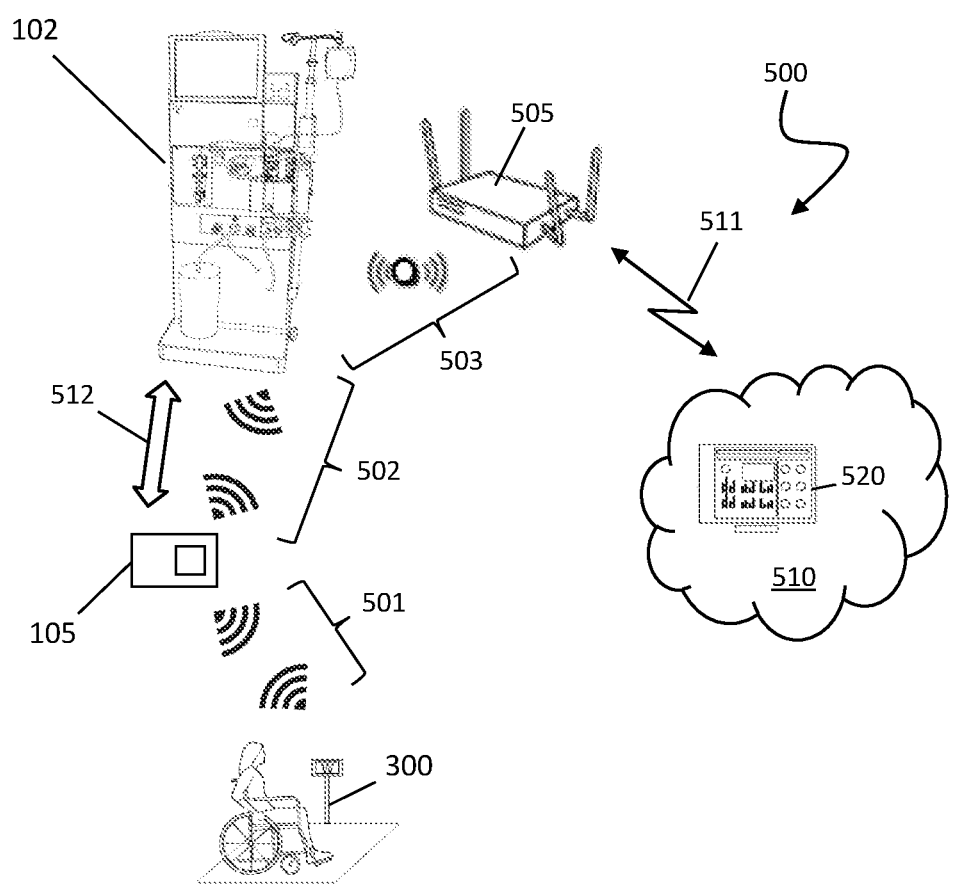
FIG. 5 is a schematic illustration of the multi-function wireless device in connection with use within a connected health system according to an implementation of the system described herein.

FIG. 5 is a schematic illustration of an implementation of the dialysis system 100 with data transfer interconnection among medical devices using a multi-function wireless device 105 and that is shown in connection with use of a connected health system 500. According to the system described herein, the multi-function wireless device 105 is brought into proximity of a weight scale 300 and/or other measurement device for transfer of data from the weight scale 300 to the multi-function wireless device 105 over a connection 501, such as via an NFC connection, and the multi-function wireless device 105 may transfer the data to the dialysis machine 102 over a connection 502, such as an NFC connection, as further described elsewhere herein. Additionally, in the connected health system 500, a gateway device 505 may control establishing of a short-range network connection 503, such as an WiFi or Bluetooth network connection, that enables short-range communication among components, including the gateway device 505 and the dialysis machine 102, to enable secure transfer of information from the dialysis machine 102 to the gateway 505, and which may include information obtained and transferred by the multi-function wireless device 105 and about the treatment performed by the dialysis machine 102. The multi-function wireless device 105 may be further positioned to perform a medical function, such as wetness detection, when disposed on a patient's arm near a patient's blood access site. The medical function of the multi-function wireless device 105 may further involve a connection 512 with the dialysis machine 102, such as transmission of an alert and/or causing the dialysis machine 102 to stop a treatment, that may be separate and/or independent from the data transfer connection 502 with the dialysis machine 102. It is additionally noted that in other implementations, the connections 501, 502 for data transfer to/from the multi-function wireless device 105 may involve the use of multiple wireless protocols, including use of a protocol (e.g. NFC) for communicatively pairing the multi-function wireless device 105 as well as use of a different protocol (e.g. RFID or Bluetooth) for transferring data over a longer distance range.

In another implementation, it is envisioned that connection among components facilitated by the gateway device 505 may also include facilitating the connection among the multi-function wireless device 105, the weight scale 300, and/or the dialysis machine 102. In an implementation, the dialysis system 100, and other short-range networked connected components as described herein, may be implemented in a patient's home for a home dialysis treatment. As further illustrated, the connected health system 500 may include components that enable establishment of a secure network connection 511 with a remote server, database or cloud-based service, e.g., computer 520 shown in connection with a network system 510. In an implementation, as illustrated, the secure network connection 511 may be established using the gateway device 505 that controls secure access to the unsecure network, such as the Internet, and in some implementations, may establish connection using a wide area network and/or a mobile telecommunications network.

In another implementation of the system described herein, the multi-function wireless device 105 may include features of a full-featured patient data card, similar to the PatientCard chipcard that is used in some Fresenius Medical Care clinics. In a patient data card implementation, the wetness detector/data transfer device 200 may be unique to each patient and stored with the patient's personal files and checked out for each clinic visit. The device may provide data encryption to protect personal data of the patient, such as the patient's name, birthdate, treatment record, medical ID number, and prescription. It may also feature a label on the housing for writing the patient's name or ID number for easy identification purposes. Bluetooth, NFC, or other short-range wireless protocol may enable connecting to the scale, receiving the scale weight, and then transferring the weight and other information, e.g. prescription, when in range of the target dialysis machine, as described in detail herein.

In multiple implementations, types of devices that may be connected through the wireless transfer device to provide for exchange of information among the devices, include, for example: dialysis machines, including hemodialysis or peritoneal dialysis machines, fluid status monitors such as the Body Composition Monitor (BCM) from Fresenius Medical Care, smart scales; blood monitors, such as the Crit-Line blood volume monitor from Fresenius Medical Care, glucose monitors, health trackers, bioimpedance scales, and/or temperature sensors, among other medical devices or monitors. When all these systems are interconnected and running the same communication protocol, new efficiencies may be gained by analysis in the cloud of activities that extend beyond those in the clinic's day, including day-to-day tracking with inputs at the patient's home and with other care providers, and including use of advanced analytic techniques and artificial intelligence. For example, benefits may include comparing, in real time or near real time, a patient's subcutaneous blood sugar reading with the measured blood volume during a hemodialysis treatment to better understand refilling rates. Alternatively and/or additionally, the system described herein may provide for monitoring a patient's prescription for dialysis medications and automatically reordering them as necessary.

In another implementation, the patient may take a device complementary to their wetness detector/data transfer device that could connect to their own smart scale used by the patient every day at home under private conditions that could over time could yield a more reliable dialysis pre-weight than the scale used in a clinic for a fully dressed patient. Upon visiting the clinic with this complementary device, when the patient is connected for treatment, this complementary device could securely transfer that data through the wetness detector device with scale transfer function to deliver a packet of those weights measured at home to incorporate in the patient's record for further analysis.

Figure 6:
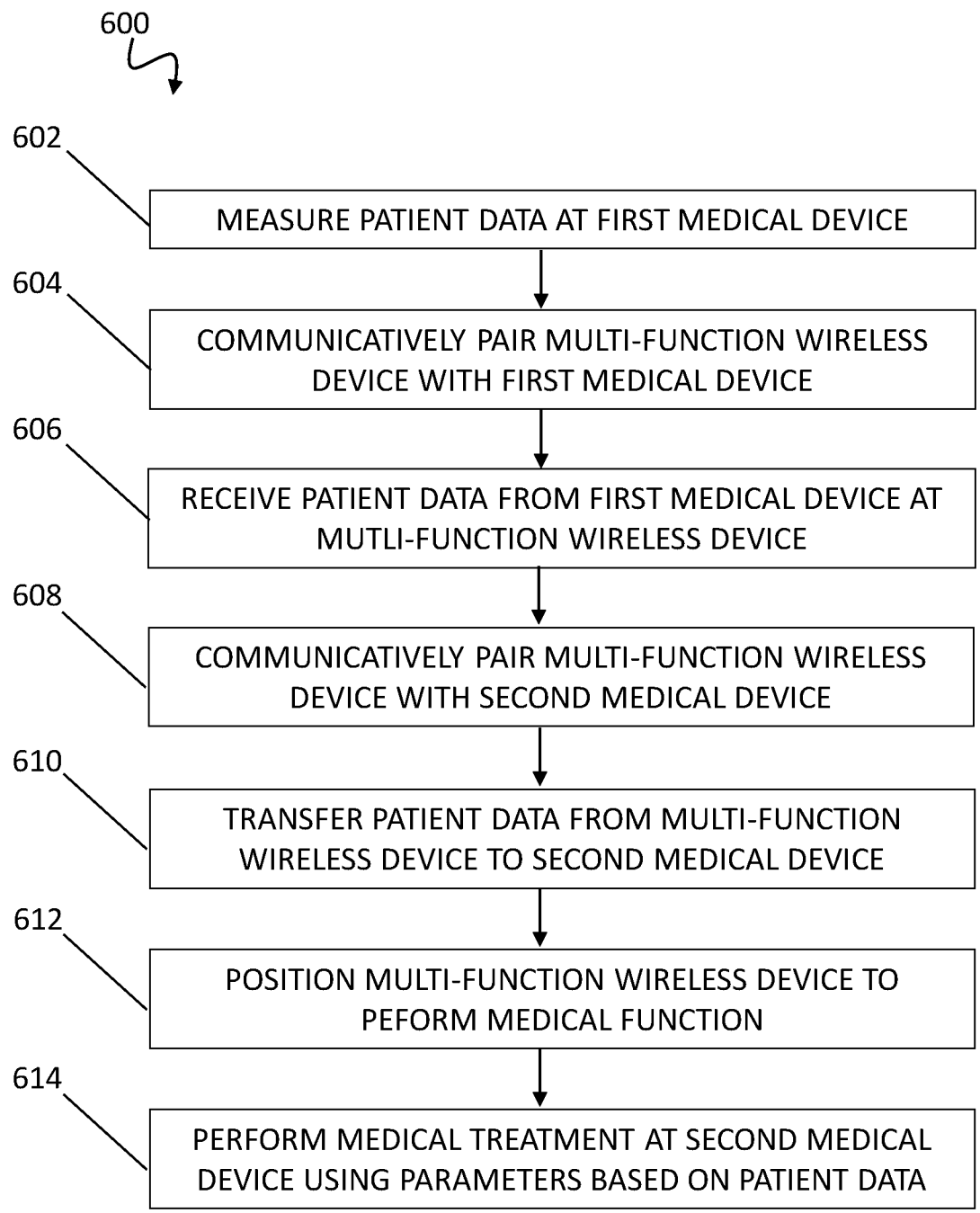
FIG. 6 is a flow diagram showing a process for data transfer among interconnected medical devices using a multi-function wireless device according to one or more implementations of the system described herein.

FIG. 6 is a flow diagram 600 showing a process for data transfer among interconnected medical devices using a multi-function wireless device according to one or more implementations of the system described herein. At a step 602, patient data is measured at a first medical device. For example, the patient data may be weight data obtained by a weight scale and/or blood pressure data obtained by a blood pressure cuff, among other possible patient data from other peripheral medical devices. At a step 604, a multi-function wireless device according to the system described herein may be communicatively paired with the first medical device. According to the system described herein, in addition to a data transfer function, the multi-function wireless device may have a medical function and, for example, may be a device used for medical monitoring, such as wetness detection, that is to be used in connection with a later medical treatment. The pairing and data connection may include, for example, establishing an NFC connection between the multi-function wireless device and the first medical device. In an implementation, the NFC connection may be established by pressing a button or other suitable interface on the multi-function wireless device and/or the first medical device. In another implementation, the pairing and connection may be established only by bringing the multi-function wireless device in close proximity (e.g. NFC distance) to the first medical device without the need for a manual activation of an interface/button. At a step 606, the multi-function wireless device receives the measured patient data from the first medical device, such as a weight measurement of the patient, and which patient data is stored on the multi-function wireless device.

At a step 608, the multi-function wireless device is communicatively paired with a second medical device. In an implementation, the second medical device may be a dialysis machine, and the pairing may include establishing an NFC connection between the multi-function wireless device and the second medical device. In an implementation, the NFC connection may be established by pressing a button, or activating other suitable interface, on the multi-function wireless device and/or on the second medical device. In another implementation, the pairing may be established only by bringing the multi-function wireless device in close proximity (e.g. NFC distance) to the second medical device without the need for a manual activation of an interface/button. In an implementation, confirmation of the pairing with the second medical device may be performed by a user (e.g. clinician) of the multi-function wireless device. At a step 610, the patient data previously obtained from the first medical device and stored by the multi-function wireless device is transferred to the second medical device.

At a step 612, the multi-function wireless device is positioned for performing its medical function. For example, as a wetness detector, the multi-function wireless device may be taped at a patient's arm at location near an access site of the patient used in connection with a dialysis treatment, and may function as a wetness detector to detect any fluid leaks near the access site. In some implementations, it is envisioned that the order of performing steps 610 and 612 may be changed. At a step 614, a medical treatment, such as the dialysis treatment, may be performed by the second medical device on the patient, and for which parameters of the medical treatment (e.g. dialysis treatment) have been configured based on the patient data transferred from the multi-function wireless device. For example, the patient weight obtained at the dialysis machine according to the system described herein may be used to determine the ultrafiltration goal for the dialysis treatment.

Implementations discussed herein may be combined with each other in appropriate combinations in connection with the system described herein. Additionally, in some instances, the order of steps in the flow diagrams, flowcharts and/or described flow processing may be modified, where appropriate. The system may further include a display and/or other computer components for providing a suitable interface with a user and/or with other computers. Aspects of the system described herein may be implemented or controlled using software, hardware, a combination of software and hardware and/or other computer-implemented or computer-controlled modules or devices having described features and performing described functions. Data exchange and/or signal transmissions to, from and between components of the system may be performed using wired or wireless communication. This communication may include use of one or more transmitter or receiver components that securely exchange information via a network, such as an intranet or the Internet, and may include use of components of local area networks (LANs) or other smaller scale networks, such as NFC, Wi-Fi, Bluetooth or other short-range transmission protocols, and/or may include use of components of wide area networks (WANs) or other larger scale networks, such as mobile telecommunication networks.

Software implementations of aspects of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system. The meanings of any method steps of the invention(s) described herein are intended to include any suitable method of causing one or more parties or entities to perform the steps unless a different meaning is expressly provided or otherwise clear from the context.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c].

Implementations of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A medical system, comprising:
    a first medical device that is configured to measure patient data;
    a second medical device that is configured to perform a medical treatment based on parameters related to the patient data; and
    a multi-function wireless device that is configured to perform a medical function and that is configured to perform a data transfer function between the first medical device and the second medical device, wherein the multi-function wireless device is configured to establish a first wireless connection with the first medical device and to receive the patient data from the first medical device, wherein the multi-function wireless device is configured to establish a second wireless connection with the second medical device and to transfer the patient data to the second medical device, and wherein the multi-function wireless device is configured to perform the medical function related to the medical treatment at the second medical device.

2. The medical system according to claim 1, wherein the first wireless connection and the second wireless connection are short-range wireless connections.

3. The medical system according to claim 2, wherein the first wireless connection and the second wireless connection are Near Field Communication (NFC) connections.

4. The medical system according to claim 1, wherein the medical function of the multi-function wireless device includes wetness detection.

5. The medical system according to claim 1, wherein the first medical device is a weight scale, and the patient data includes a weight of a patient.

6. The medical system according to claim 1, wherein the second medical device is a dialysis machine, and the medical treatment is a dialysis treatment.

7. The medical system according to claim 6, wherein the parameters related to the patient data include an ultrafiltration goal for the dialysis treatment.

8. The medical system according to claim 1, wherein the multi-function wireless device includes an interface for a user to initiate a connection and a display for indicating the connection.

9. The medical system according to claim 1, further comprising:
    a gateway device that is communicatively coupled to the second medical device and is configured to receive data from the second medical device over a short-range wireless connection.

10. The medical system according to claim 9, wherein the gateway device is further configured to transmit the data from the second medical device over a network connection to a remote server.

11. A method for performing data transfer among medical devices, comprising:
    measuring patient data at a first medical device;
    communicatively pairing a multi-function wireless device with the first medical device to establish a first wireless connection;
    receiving the patient data at the multi-function wireless device from the first medical device over the first wireless connection;
    communicatively pairing the multi-function wireless device with a second medical device to establish a second wireless connection;

transferring the patient data from the multi-function wireless device to the second medical device over the second wireless connection; and determining parameters of a medical treatment that is performed by the second medical device, wherein the parameters are related to the patient data, wherein the multi-function wireless device performs a medical function related to the medical treatment at the second medical device.

12. The method according to claim 11, wherein the first wireless connection and the second wireless connection are short-range wireless connections.

13. The method according to claim 12, wherein the first wireless connection and the second wireless connection are Near Field Communication (NFC) connections.

14. The method according to claim 11, wherein the medical function of the multi-function wireless device includes wetness detection.

15. The method according to claim 11, wherein the first medical device is a weight scale, and the patient data includes a weight of a patient.

16. The method according to claim 11, wherein the second medical devices is a dialysis machine, and the medical treatment is a dialysis treatment.

17. The method according to claim 16, wherein the parameters related to the patient data include an ultrafiltration goal for the dialysis treatment.

18. The method according to claim 11, wherein the multi-function wireless device includes an interface for a user to initiate a connection and a display for indicating the connection.

19. The method according to claim 11, further comprising:

communicatively coupling a gateway device to the second medical device, wherein the gateway device is configured to receive data from the second medical device over a short-range wireless connection.

20. The method according to claim 19, wherein the gateway device is further configured to transmit the data from the second medical device over a network connection to a remote server.

21. A multi-function wireless device for use in a medical system, comprising:

a medical function module that is configured to perform a medical function; and a data transfer module that is configured to perform a data transfer function between a first medical device and a second medical device, wherein the multi-function wireless device is configured to establish a first wireless connection with the first medical device and to receive patient data from the first medical device, and wherein the multi-function wireless device is configured to establish a second wireless connection with the second medical device and to transfer the patient data to the second medical device, wherein the medical function module is configured to perform the medical function related to a medical treatment at the second medical device.

22. The multi-function wireless device according to claim 21, wherein the first wireless connection and the second wireless connection are short-range wireless connections.

23. The multi-function wireless device according to claim 22, wherein the first wireless connection and the second wireless connection are Near Field Communication (NFC) connections.

24. The multi-function wireless device according to claim 21, wherein the medical function of the multi-function wireless device includes wetness detection, wherein the medical function module includes a sensor to detect wetness, wherein the second medical device is a dialysis machine, and wherein the medical function module outputs a signal to the dialysis machine over a communication connection that is separate from the first wireless connection and the second wireless connection.

* * * * *